United States Patent
Cain et al.

[11] Patent Number: 5,858,427
[45] Date of Patent: Jan. 12, 1999

[54] FLEXIBLE ICE-CREAM COATING COMPOSITIONS

[75] Inventors: Frederick W. Cain, Voorburg; Helga Gerda A. Manson née van der Struik, Amstelveen; Jeroen Nicolaas M. van Straalen, Wognum, all of Netherlands

[73] Assignee: Loders-Croklaan B. V., Wormerveer, Netherlands

[21] Appl. No.: 817,905

[22] PCT Filed: Sep. 22, 1995

[86] PCT No.: PCT/EP95/03748

§ 371 Date: Mar. 31, 1997

§ 102(e) Date: Mar. 31, 1997

[87] PCT Pub. No.: WO96/10338

PCT Pub. Date: Apr. 11, 1996

[30] Foreign Application Priority Data

Sep. 30, 1994 [EP] European Pat. Off. ............. 94202833

[51] Int. Cl.⁶ ............................. A23D 7/00; A23G 9/00
[52] U.S. Cl. ..................... 426/101; 426/607; 426/613
[58] Field of Search .................... 426/100, 101, 426/607, 613

[56] References Cited

U.S. PATENT DOCUMENTS

| | | | |
|---|---|---|---|
| Re. 30,722 | 8/1981 | Olds | 426/101 |
| 4,394,392 | 7/1983 | Tresser | 426/101 |
| 4,414,239 | 11/1983 | Oven | 426/607 |
| 4,430,350 | 2/1984 | Tresser | 426/101 |
| 4,560,563 | 12/1985 | Tresser | 426/606 |
| 5,017,392 | 5/1991 | Bombardier | 426/101 |
| 5,215,780 | 6/1993 | Merdenbauer | 426/607 |
| 5,273,763 | 12/1993 | Merz | 426/602 |
| 5,431,947 | 7/1995 | Bennett | 426/606 |
| 5,431,948 | 7/1995 | Cain | 426/607 |

FOREIGN PATENT DOCUMENTS

| | | |
|---|---|---|
| 189 669 | 8/1986 | European Pat. Off. . |
| 199 580 | 10/1986 | European Pat. Off. . |
| 424 997 | 5/1991 | European Pat. Off. . |
| 427 309 | 5/1991 | European Pat. Off. . |
| 428 200 | 5/1991 | European Pat. Off. . |
| 483 414 | 5/1992 | European Pat. Off. . |
| 502 697 | 9/1992 | European Pat. Off. . |
| 2 435 206 | 4/1980 | France . |

OTHER PUBLICATIONS

Derwent Publications Ltd., Week 8042, London, GB; AN 80–74150c re JP–A–55 114 261.

*Primary Examiner*—Carolyn Paden
*Attorney, Agent, or Firm*—Pillsbury Madison & Sutro LLP

[57] ABSTRACT

Flexible ice-cream coating compositions are obtained by using as fat for the fatphase a triglyceride-composition, comprising:

<8 wt % of SSS
25–80 wt % of SUS
2–40 wt % of $SU_2$
>5 wt % of $U_3$
    S=saturated fatty acid $C_{16}$–$C_{24}$
    U=unsaturated fatty acid $C_{18+}$.

12 Claims, No Drawings

FLEXIBLE ICE-CREAM COATING COMPOSITIONS

This application is the national phase of international application PCT/EP95/03748 filed Sep. 22, 1995 which designated the U.S.

BACKGROUND OF THE INVENTION

1. Field of the Invention

The invention relates to flexible ice-cream coating compositions comprising sugar and a special triglyceride composition, and the use of such compositions in providing coated ice cream products.

2. Description of Related Art

Conventional ice-cream coatings are based on lauric fats. Preferred lauric fats applied for this purpose are coconut oil and palm kernel oil or fractions thereof. However, such fats have drawbacks when applied in ice-cream coatings. Apart from the fact that the SAFA-level, ie. the total of saturated fatty acids and trans-unsaturated fatty acids is very high (90–100%), it was also found that the use of these fats in ice-cream coatings led to products that were brittle. Therefore these products are difficult to process and must be handled with care upon transportation, for else the coatings will crack.

A solution for this problem was found in the development of so called "flexible ice-cream coatings". An example of a flexible ice-cream fat composition is disclosed in EP 502, 697. According to this disclosure the composition should contain a fat phase that comprises 10–85 wt % of $S_2U$-triglycerides and 15–90 wt % of $SU_2$-triglycerides, while at least 35 wt % $S_2U$ consists of $S_2Ln$ (Ln=$C_{18:2}$). According to the specification fats, wherein the $S_2Ln$ mainly consists of SSLn are useful for frozen desserts. In the examples 16, 17 and 18 different applications of these fats are illustrated; ie. in ice-cream-in-sugar corn cups; as cub-like chocolates in ice-cream and as ice-cream bars, containing a chocolate centre. Also the application of these fats in ice-cream coatings or as coating of an ice-cream cone is mentioned in the text. It is further disclosed that the presence of liquid fats would be useful for oral mouth feel, but is disadvantageous for the cooling properties. We found novel fat compositions, that combine good flexibility with good drying times and still contain appreciable amounts of liquid oil. Moreover, the use of fats high in SSLn means that no natural fats can be applied, as no natural fat is known that is high in SSLn. Therefore these fats must by synthesized.

We have studied, whether we could find fats, that when applied in ice-cream coating compositions would display at least a similar flexibility as the above known fats, however the fats should be derivable from natural fats.

Moreover the fats should, when applied in ice-cream coating compositions lead to compositions with a viscosity at the temperature of its use, which enables it to spray them on the inside of a (ice-cream) cone, without sticking to the top of the cone and/or without running through the cone and collecting as a liquid mass at the bottom of the cone.

For this purpose so far partially hardened rapeseed oil was often used. This fat however is rich in trans fatty acids and is therefore considered as unhealthy.

BRIEF DESCRIPTION OF THE INVENTION

Therefore our invention concerns flexible ice-cream coating composition, comprising at least a sugar and a triglyceride-composition, wherein the triglyceride composition comprises:

| | |
|---|---|
| <8 wt %, | preferably <5 wt %, most preferably <2 wt % of SSS; |
| 25–80 wt %, | preferably 35–75 wt % of SUS; |
| 2–40 wt %, | preferably 5–20 wt % of $SU_2$; |
| >5 wt %, | preferably >10 wt %, most preferably 15–45 wt % of $U_3$, | wherein S and U are fatty acid residues in the triglycerides,

S being saturated fatty acid with $C_{16}$–$C_{24}$

U being unsaturated fatty acid with $\geq 18$ C-atoms.

Although S can be a saturated fatty acid with 16–24 C-atoms, we prefer S to have 16–18 atoms. The most preferred are the fats that have a $C_{16:0}$:$C_{18:0}$ weight ratio of 0.4 to 9.0, preferably 0.8 to 3.0. In particular the fats having an StOSt-content of the SUS-component of at least 20 wt %, preferably at least 25 wt %, most preferably 30–50 wt % are applied.

U in above definition can be any mono- or polyunsaturated fatty acid with at least 18 C-atoms. This thus includes both cis and trans unsaturated fatty acids. However we prefer to use the cis-isomers, as those are considered to be healthier than the trans isomers. A particular preference exists for fats, wherein U comprises $C_{18:1}$ and $C_{18:2}$, while the weight-ratio SOS:SLnS (O=$C_{18:1}$; Ln=$C_{18:2}$) in the triglyceride part is more than 3.0, preferably more than 6.0.

Very suitable ice-cream coatings are obtained, when the triglycerides-part of the composition displays a solid fat index (NMR-pulse: not stabilized) at the temperature indicated of:

$N_0$>35, preferably 40–80

$N_{20}$>5, preferably>10; most preferably 15–60

$N_{25}$=0–35, preferably 2–20

Another advantage of our invention is, that it enables us to apply fats with high contents of unsaturated fatty acids. Therefore we prefer to use fat compositions that have a content of cis-unsaturated.fatty acids of more than 20 wt %, preferably more than 30 wt %, in particular 50–80 wt %.

DETAILED DESCRIPTION OF THE INVENTION

Our triglyceride-compositions can be made by synthetic routes e.g. by chemical or enzymic (inter) esterification of appropriate starting materials. Examples thereof being: glycerol, monoglycerides, diglycerides and triglycerides, which can be converted with the appropriate fatty acids, fatty acid esters, anhydrides or other triglycerides.

However, a far more convenient route for the preparation is by using natural fats or fractions thereof. Therefore we prefer flexible ice-cream coating compositions wherein the triglyceride-part is a blend of natural fats A and B or fractions thereof, wherein fat A has a SUS-level of more than 35 wt%, preferably more than 70 wt %, while fat B is a liquid fat with an $N_{20}$<5, that contains preferably more than 30 wt % of ($U_2S$+$U_3$)-triglycerides, while the ratio of $U_3$:$U_2S$ is>1.0. In above compositions the weight ratio for fats A and B suitably ranges from 80:20 to 40:60.

Although a wide range of fats A and B can be applied, we prefer to use a fat A that is derived from palm oil, shea, illipe, cocoa butter or fractions thereof while fat B preferably is selected from the group, consisting of sunflower-oil, high oleic sunflower oil, maize oil, soybean oil, olive oil, safflower oil, canola oils.

The most preferred fats A are natural fats or fractions thereof, that have a $C_{16:0}$-content of more than 15 wt %, preferably 25–75 wt %.

Part of our invention are also flexible ice-cream coating compositions, that comprise:

25–60 wt % of a sugar

20–70 wt % of the triglyceride-composition as defined above %0–30 wt % of at least one of the components from the group consisting of: cocoa powder, milk protein, lactose, emulsifier, one or more flavours, such as: strawberry, lemon, raspberry, yogurt, etc.

The coated ice-creams, which are obtained after coating the ice-cream with the fats described above, e.g. by dipping are also part of the invention.

Further ice-creams in a cone, wherein the cone is coated with the compositions according to the invention are also part of the invention.

EXAMPLES 1.1. The following recipe was applied:

|  | wt % |
|---|---|
| sugar | 42.7 |
| fat | 38.1 |
| cocoa powder N/11/N | 12.5 |
| skim milk powder | 6.2 |
| lecithin | 0.5 |

The following fats were applied:

A: coconut oil (=reference)
B: cocoa butter (=reference)
C: a mixture of cocoa butter equivalent and liquid oil (45:55).

The triglyceride-compositions of fat C was:

|  | SSS | SUS | $SU_2$ | $U_3$ |
|---|---|---|---|---|
| wt % | 0.9 | 41 | 15 | 43 |

Its $C_{16:0}/C_{18:0}$ weight-ratio was: 1.1

1.2. The coatings were made by mixing the ingredients, refining the blend on a 3-roll refiner and conching. The compositions were kept at about 40° C. and ice-creams were dipped into the compositions.

1.3. Dripping time, drying time, weight % coating on product and flexibility of the coating were evaluated. The results are given below

| Coating fat | Coat T °C. | Flexibility | Drip time (sec) | dry-time (sec) | weight % |
|---|---|---|---|---|---|
| A | 40 | 2–3 | 16 | 42 | 21 |
| B | 40 | 3 | 20 | 119 | 30 |
| C | 40 | 4–5 | 21 | 198 | 31 |

Flexibility is given on a scale 0–5
1=not flexible
5=very flexible 1.4. From above results it can be concluded that our new compositions, based on fat C provide the best flexible coatings. Drip-times are about similar. The weight % coating on product is similar, except for fat A, where it is low. Dry-times are longer for fat C and shortest for fat A.

EXAMPLE 2

Example 1 was repeated, however, applying the following recipe:

| Sugar: | 25.8 |
|---|---|
| Fat: | 59.2 |
| Cocoa powder N/11/N: | 13.0 |
| Skim milk powder: | 1.7 |
| Lecithin: | 0.3 |

The following fats D, E, F and G were applied:
Fat D=80% cocoa butter equivalent; 20% palm oil olein
Fat E=60% cocoa butter equivalent; 40% palm oil olein
Fat F=80% cocoa butter equivalent; 20% sunflower oil
Fat G=80% cocoa butter equivalent; 20% soybean oil
The triglyceride-composition of this fat was:

| Fat | $S_3$ | SUS | $SU_2$ | $U_3$ | $C_{16}:C_{18}$ - sat |
|---|---|---|---|---|---|
| D | 2.5 | 71.1 | 15.8 | 1.3 | 8.3 |
| E | 2.1 | 59.1 | 27.9 | 2.3 | 8.6 |
| F | 2.3 | 67.3 | 6.8 | 16.1 | 7.1 |
| G | 2.3 | 68.0 | 10.0 | 11.3 | 7.5 |

The evaluation of the results led to the following.

| Fat in coating | Temp °C. | flexibility | driptime (sec) | dry-time (sec) | % weight |
|---|---|---|---|---|---|
| D | 40 | 2 | 8 | 76 | 16 |
| E | 40 | 3 | 8 | 93 | 15 |
| F | 40 | 4–5 | 8 | 67 | 16 |
| G | 40 | 4–5 | 7 | 58 | 15 |

So the coatings according to our invention (F and G) displayed the best flexiblity, while also the dry-times were the shortest.

EXAMPLE 3

3.1 Coating compositions were made, using the following recipe:

|  | wt % |
|---|---|
| Fat | 44.8 |
| Sugar | 42.6 |
| Cocoa powder N11N | 12.0 |
| Lecithin | 0.5 |

The following fats were applied

| Fat H = | partially hardened rapeseed oil, m.pt. 32° C. |
|---|---|
| Fat I = | coconut oil |
| Fat J = | 80% cocoa butter eq/20% sunflower oil |
| Fat K = | 80% coconut oil topfraction/20% sunflower oil |
| Fat L = | high oleic sunflower oil |

3.2 The compositions were sprayed into standard sleeved Cornetto cones, using a De Vilbiss—air atomising gun. The temperatures of spraying varied with the fat and were inside the range of 28°–40° C., so that the viscosity of the compositions were similar. The weight-increase of the cones varied from 0.1–0.3 g. in all cases.

3.3 Ice-cream was dosed into the sprayed cones. Cardboard lids were placed in the sleeves and the products were cooled to −20° C. during 24 hrs. The products were store at −10° C.

3.4 The different products were evaluated on its crispness by tactile and oral assessment. The keepability is taken as the day in which the avarage crispness score of five cones has decreased to "Borderline/Unacceptable". The results were as follows:

| Fat | Keepability (days at −10 ° C.) |
|-----|-------------------------------|
| H   | 32 |
| I   | 24 |
| J   | 30 |
| K   | 24 |
| L   | 10 |

So our fat J led to results comparable with the commercial fat H (being high in trans) and far better than other (non-trans) fats.

We claim:

1. Flexible ice-cream coating composition, comprising at least a sugar and a triglyceride-composition, wherein the triglyceride compositon comprises:

<8 wt % of SSS;
25–80 wt % of SUS;
2–40 wt % of $SU_2$;
>5 wt % of $U_3$, the triglyceride composition displaying a solid fat index (NMR-pulse; not stabilized) at the temperature indicated of:

$N_0$ of 40–80;
$N_{20}$ of 15–60, and
$N_{25}$ of 2–20, wherein S and U are fatty acid residues in the triglycerides, S being saturated fatty acid with $C_{16}$–$C_{24}$ U being unsaturated fatty acid with $\geq 18$ C-atoms, the weight ratio of SOS:SLnS, wherein O is $C_{18:1}$ and Ln is $C_{18:2}$, in the triglyceride being more than 3.0.

2. Flexible ice-cream coating composition according to claim 1, wherein S=saturated fatty acid with 16–18 C-atoms, while the ratio $C_{16:0}$:$C_{18:0}$ in the triglyceride part of the composition ranges from 0.4 to 9.0.

3. Flexible ice-cream coating compositions according to claim 1, wherein U comprises $C_{18:1}$ and $C_{18:2}$, while the weight-ratio SOS:SLnS in the triglyceride part is more than 6.0.

4. Flexible ice-cream coating composition according to claim 1, wherein the fatphase of the composition has a content of cis-unsaturated fatty acids of more than 20 wt %.

5. Flexible ice-cream coating composition according to claim 1, wherein the triglyceride-part is a blend of natural fats A and B or fractions thereof, wherein fat A has a SUS-level of more than 35 wt %, while fat B is a liquid fat with an $N_{20}$<5, that contains more than 30 wt % of ($U_2S+U_3$)—triglycerides having a weight-ratio $U_3$:$U_2S$ of more than 1.0.

6. Flexible ice-cream coating composition according to claim 5, wherein the weight-ratio for fat A to fat B ranges from 80:20 to 40:60.

7. Flexible ice-cream coating composition according to claim 5, wherein fat A is derived from palm oil, shea, illipe, cocoa butter or fractions thereof and fat B is selected from the group consisting of sunflower oil, maize oil, soybean oil, olive oil, sunflower oil, high oleic sunflower and canola oils.

8. Flexible ice-cream coating composition according to claim 5, wherein fat A is a natural fat or fraction thereof with a $C_{16:0}$-content of more than 15 wt %.

9. Flexible ice-cream coating composition according to claim 1, comprising:

25–60 wt % of a sugar

20–70 wt % of the triglyceride-composition as defined in claim 1

0–30 wt % of at least one of the components from the group consisting of: cocoa powder, milk protein, lactose, emulsifier and flavours.

10. Coated ice-cream, wherein the ice-cream is coated with the composition according to claim 1.

11. Ice-creams in a coated cone, wherein the cone is coated with the composition according to claim 1.

12. A flexible ice-cream coating composition according to claim 1 wherein the triglyceride composition comprises:

<2 wt % of SSS;
35–75 wt % of SUS;
5–20 wt % of $SU_2$;
15–45 wt % of $U_3$.

* * * * *